United States Patent [19]

Arita et al.

[11] Patent Number: 4,875,980
[45] Date of Patent: Oct. 24, 1989

[54] METHOD FOR SEPARATING AND CONCENTRATING AN ORGANIC COMPONENT FROM AN AQUEOUS SOLUTION CONTAINING SAME

[75] Inventors: Masujiro Arita, Tokyo; Yukinobu Sugimoto, Yokohama, both of Japan

[73] Assignees: Mitsubishi Rayon Engineering Co., Ltd.; Mitsubishi Rayon Co., Ltd., both of Tokyo, Japan

[21] Appl. No.: 89,448

[22] Filed: Aug. 26, 1987

[30] Foreign Application Priority Data

Sep. 2, 1986 [JP] Japan .................................. 61-206238

[51] Int. Cl.$^4$ ............................................ B01D 13/00
[52] U.S. Cl. ........................................ 203/14; 203/17;
203/18; 203/19; 203/77; 159/DIG. 27;
210/500.23; 210/640; 210/641; 435/161;
549/429; 564/497; 568/411; 568/916
[58] Field of Search ...................... 203/14, 19, 18, 17,
203/DIG. 13, 71, 72, 86, 91, 49, 99, 4, 73;
210/641, 640, 500.23; 202/173, 205, 267, 236;
159/DIG. 27, DIG. 28, 49, 13.4; 426/494, 493;
568/411, 916, 913; 435/161

[56] References Cited

U.S. PATENT DOCUMENTS

| | | | |
|---|---|---|---|
| 2,981,680 | 4/1961 | Binning | 210/640 |
| 3,043,891 | 7/1962 | Stuckey | 210/640 |
| 3,361,645 | 1/1968 | Bodell | 159/DIG. 27 |
| 3,617,550 | 11/1971 | Elata et al. | 210/641 |
| 3,649,467 | 3/1972 | Winsel et al. | 202/160 |
| 4,311,594 | 1/1982 | Perry | 210/640 |
| 4,350,594 | 9/1982 | Kawai et al. | 210/641 |
| 4,419,187 | 12/1983 | Cheng et al. | 159/DIG. 27 |
| 4,499,117 | 2/1985 | Bonneau | 203/DIG. 13 |
| 4,545,862 | 10/1985 | Gore et al. | 159/DIG. 27 |
| 4,581,236 | 4/1986 | Bandel et al. | 210/641 |
| 4,591,440 | 5/1986 | Higashimura et al. | 210/640 |
| 4,620,900 | 11/1986 | Kimura et al. | 159/DIG. 27 |

FOREIGN PATENT DOCUMENTS

| | | | |
|---|---|---|---|
| 158798 | 10/1985 | European Pat. Off. | 210/651 |
| 54-124875 | 9/1979 | Japan | 210/641 |
| 58-21629 | 2/1983 | Japan | 203/18 |
| 58-55001 | 4/1983 | Japan | 203/3 |
| 61-199788 | 9/1986 | Japan . | |
| 564870 | 7/1977 | U.S.S.R. | 203/19 |

OTHER PUBLICATIONS

European Search Report/Appln. EP 87 11 2810; 20-1-1-1987, *Kirk-Othmer Encyclopedia of Chemical Technology*, 15, p. 102, 1.14 and pp. 104–105, 1981.

Primary Examiner—Wilbur Bascomb
Attorney, Agent, or Firm—Oblon, Spivak, McClelland, Maier & Neustadt

[57] ABSTRACT

Disclosed is a method for separating and concentrating an organic component having a lower boiling point than water from an aqueous solution containing the organic component which comprises the steps of (1) bringing an aqueous solution containing an organic component having a lower boiling point than water into contact with one surface of a hydrophobic porous membrane, continuously or intermittently evacuating the side of the porous membrane opposite to the aqueous solution to obtain a concentrated vapor of the organic component, and liquefying the vapor; and (2) bringing the resulting concentrated aqueous solution into contact with one surface of a hydrophobic nonporous membrane, evacuating the side of the non-porous membrane opposite to the concentrated aqueous solution to obtain a further concentrated vapor of the organic component, and liquefying the vapor. When this method is applied, for example, to a continuous fermentation process, the fermentation can be continued with efficient removal of the fermentation product from the broth.

19 Claims, 2 Drawing Sheets

METHOD FOR SEPARATING AND CONCENTRATING AN ORGANIC COMPONENT FROM AN AQUEOUS SOLUTION CONTAINING SAME

BACKGROUND OF THE INVENTION

1. Field of the Invention

This invention relates to a method for efficiently separating and concentrating a useful organic component having a lower boiling point than water (hereinafter referred to as an organic component having a low boiling point) from an aqueous solution (such as a broth or the like) by the utilization of a hydrophobic porous membrane and a hydrophobic nonporous membrane.

2. Description of the Prior Art

Conventionally, the commonest method for separating and concentrating an organic component having a low boiling point from an aqueous solution containing organic materials has been distillation. Recently, studies have also been made of other separation and concentration methods including the methods of concentration by use of a reverse osmosis membrane or by pervaporation through a membrane.

Moreover, if fermentation is carried out continuously, the resulting fermentation product accumulates in the system and acts as a fermentation inhibitor. As a result, it becomes impossible to continue the fermentation. In order to avoid this difficulty, a continuous fermentation process is known in which the fermentation product is continuously separated from the broth within the fermenter by use of a hydrophilic ultrafiltration membrane.

However, in the conventional distillation method for the separation and concentration of an organic component having a low boiling point from an aqueous solution, it is necessary to distil and concentrate an aqueous solution having a relatively low concentration. This is disadvantageous in that a complicated and large-sized plant is required and large energy consumption is involved. In the reverse osmosis method, the practically achievable concentration is limited to a low level. In the case of ethanol, for example, the resulting concentrated solution has a concentration limit of about 15%. This concentration level is inadequate for practical purposes. In the pervaporation method, water is selectively allowed to penetrate through a membrane so as to bring about the resultant concentration of an organic component having a low boiling point. Accordingly, great energy loss is caused because of the removal of large amounts of water.

Moreover, in the continuous fermentation process using an ultrafiltration membrane, both water and the fermentation product having a low boiling point are separated from the fermentation system, so that the raw material for fermentation (such as glucose) and the inorganic salts also go out of the fermentation system. Thus, the fermentation product must subsequently be separated therefrom. Usually, the residue from which the fermentation product has been separated is discarded. This is not only disadvantageous from an economic point of view, but also poses a problem in that the raw material for fermentation and the inorganic salts must be supplied to the fermenter so as to make up for the loss.

In order to overcome the disadvantages of the above-described prior art methods, the present inventors carried out intensive research and found that a hydrophobic porous membrane allows the passage of vapors, but does not allow the passage of an organic material-containing aqueous solution in liquid form. On the basis of this finding, the present inventor devised a method for separating and concentrating an organic component having a low boiling point from an aqueous solution containing organic components by bringing the aqueous solution containing organic components into contact with one surface of a hydrophobic porous membrane and evacuating the side of the porous membrane opposite to the aqueous solution, and disclosed it in the previous Japanese patent application No. 39408/'85. Although this method is efficient, it has been found to have the disadvantage that, when the concentration of the organic component in the aqueous solution has increased and exceeded a certain level, the pores of the hydrophobic porous membrane are made hydrophilic. This prevents further concentration because the aqueous solution in liquid form can now pass through the membrane. For example, where the organic component having a low boiling point is ethanol, it cannot be concentrated to 70% or more for the abovedescribed reason.

Furthermore, concentration methods using a hydrophobic nonporous membrane are also known. For example, silicone rubber is more permeable to the vapors of organic components having a low boiling point (such as ethanol and the like) than to water vapor, and thus makes it possible to concentrate such organic components having a low boiling point. Since such membranes are nonporous, they do not involve the above-described problems. However, hydrophobic nonporous membranes are still disadvantageous in that they have a considerably lower permeability to vapors than porous membranes and, especially when the aqueous solution has a low organic component concentration, the above permeability is too low for practical purposes because the membrane does not swell so much due to the organic component.

SUMMARY OF THE INVENTION

It is an object of the present invention to provide a method for efficiently separating and concentrating an organic component having a low boiling point from an aqueous solution containing it by simple means.

It is another object of the present invention to provide a method for separating and concentrating a useful organic component having a low boiling point, which method can be applied even to aqueous solutions containing considerable amounts of impurities, such as broths, without requiring any special pretreatment thereof.

It is still another object of the present invention to provide a method for separating and concentrating an organic component having a low boiling point, which method permits a highly concentrated aqueous solution of the organic component to be stably obtained from a relatively dilute aqueous solution of the organic component for a long period of time and at a high concentration rate.

It is a further object of the present invention to provide a method for separating and concentrating an organic component having a low boiling point, which method permits highly efficient, continuous fermentation by selectively removing the fermentation product, or the organic component having a low boiling point, from the broth.

According to the present invention, there is provided a method for separating and concentrating an organic component having a lower boiling point than water from an aqueous solution containing the organic component, which comprises the steps of (1) bringing an aqueous solution containing an organic component having a lower boiling point than water into contact with one surface of a hydrophobic porous membrane, continuously or intermittently evacuating the side of the porous membrane opposite to said aqueous solution to obtain a concentrated vapor of the organic component, and liquefying the vapor; and (2) bringing the resulting concentrated aqueous solution into contact with one surface of a hydrophobic nonporous membrane, evacuating the side of the nonporous membrane opposite to the concentrated aqueous solution to obtain a further concentrated vapor of the organic component, and liquefying the vapor.

DESCRIPTION OF THE PREFERRED EMBODIMENTS

Figure 1:
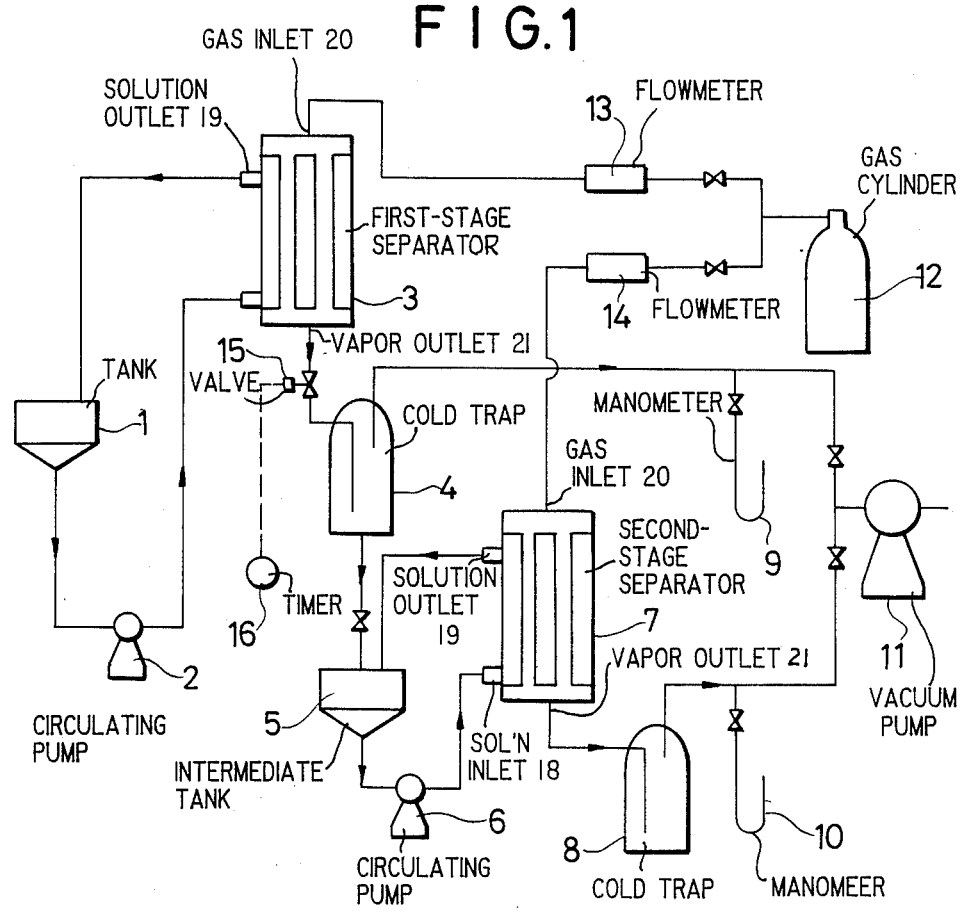
FIG. 1 is a flow chart illustrating one embodiment of the method of the present invention.

In the first stage of the method of the present invention, a concentrated vapor of an organic component having a low boiling point is obtained by bringing an aqueous solution containing the organic component having a low boiling point into contact with one surface of a hydrophobic porous membrane and evacuating the side of the hydrophobic porous membrane opposite to the aqueous solution.

The hydrophobic porous membrane used in the method of the present invention should preferably have a bubble point of not less than 1 kg/cm$^2$ and more preferably in the range of 2 to 20 kg/cm$^2$. If the bubble point is above the aforesaid upper limit, the permeation rate of the organic component to be separated and concentrated will be undesirably low. If the bubble point is lower than the aforesaid lower limit, the aqueous solution in liquid form will tend to pass through the membrane with a lapse of time when the side of the membrane opposite to the aqueous solution is evacuated.

In the case of a flat membrane, the bubble point can be determined according to the procedure of ASTM F316-80. In the case of hollow fiber membrane, the bubble point can be determined as follows: A hollow fiber module including a bundle of hollow fibers arranged in a loop is prepared and immersed in ethanol. Using an aspirator, the ethanol is sucked in until the inside of the hollow fibers is fully wetted therewith. Then, the internal pressure of the hollow fibers is elevated in 0.1 kg/cm$^2$ increments. The bubble point (in kg/cm$^2$) is defined as the pressure at which bubbles begin to appear from almost all the outer surfaces of the hollow fibers.

The porous membrane used in the method of the present invention preferably has a thickness of 10 to 100 μm and more preferably 20 to 60 μm. It also has a porosity of 20 to 80% and preferably 40 to 75%. The material of the membrane can be any of various materials, such as Teflon, polyolefins and the like, which are hydrophobic and can satisfy the aforesaid conditions. Even a membrane formed of a hydrophilic material can be used if its surfaces are rendered hydrophobic. Although flat membranes may be used, it is especially preferable to use hollow fibers for the purpose of reducing the size of the apparatus.

The organic component having a low boiling point which can be separated and concentrated according to the method of the present invention may be any organic material characterized by the fact that, in the vapor-liquid equilibrium between the organic component having a low boiling point and water, the vapor phase contains the low-boiling organic material at a higher concentration than the liquid phase in equilibrium therewith. Typical examples of such organic materials include methanol, ethanol, butanol, acetone, tetrahydrofuran and triethylamine. The method of the present invention may be applied, for example, to the recovery of organic components having a low boiling point from waste liquids discharged from various processes. However, it is particularly suitable for the recovery of an organic component having a low boiling point from a broth and especially effective in the recovery of the fermentation product, for example, from an ethanol fermentation or an acetone-butanol fermentation.

In separating and concentrating the organic component by use of a hydrophobic porous membrane, it is essential to evacuate the side of the membrane opposite to the aqueous solution containing the organic component (that side of the membrane will hereinafter be referred to briefly as the "opposite side"). This evacuation may be carried out either continuously or intermittently. The reduced pressure level to which the opposite side is evacuated should conveniently be as low as possible, because this enhances the separation rate of the organic component having a low boiling point. In practice, however, the reduced pressure level may be properly determined on the basis of the bubble point of the membrane. The reduced pressure level is usually in the range of 0.1 to 500 mmHg and preferably in the range of 0.1 to 380 mmHg. Although this evacuation may be carried out simply by evacuating the aforesaid "opposite side" by means of a pump or the like, it is preferable to evacuate the "opposite side" while causing an inert gas to flow therethrough. The flow of the inert gas permits the organic component vapor staying around the membrane surface to be effectively removed, resulting in a further improvement in separation rate. Also in this case, it is preferable to evacuate the "opposite side" to substantially the same reduced pressure level as described above. The inert gas used for this purpose can be any gas that does not react with the organic component having a low boiling point, and preferred examples of such gases include air, nitrogen gas and carbon dioxide gas.

It is more preferable to pressurize and evacuate the aforesaid "opposite side" alternately at predetermined intervals of time while causing an inert gas to flow therethrough, because this can prevent a reduction in the permeability of the porous membrane due to its clogging or other causes, as well as a reduction in the concentration of the separated organic component having a low boiling point. Accordingly, where the method of the present invention is applied, for example, to a continuous fermentation process, the alternate pressurization and evacuation permits efficient separation and concentration of the fermentation product over a long period of time.

In this case, the reduced pressure level to which the "opposite side" is evacuated may be the same as described above. The pressure to which the "opposite side" is pressurized should preferably be such that the inert gas or air bubbles in the aqueous solution. Usually, the pressure may preferably range from 150 to 760 mmHg gauge, depending on the pore size and wettability of the membrane. Below the aforesaid lower limit, a reduction in the permeability of the membrane cannot be prevented satisfactorily. Above the aforesaid upper limit, the pressurization cannot be expected to produce any additional effect in preventing a reduction in the permeability of the membrane. Moreover, such excessive pressurization undesirably causes an increase in cost and, further, involves the risk of causing damage to the membrane.

Since the organic material having a low boiling point cannot be separated during the pressurization period, the duration of the pressurization should preferably be as short as possible. However, if it is too short, the pressurization may not be satisfactorily effective in preventing a reduction in the permeability of the membrane. Thus, the duration of the pressurization in each cycle may preferably range from one second to ten minutes. The interval of time between one pressurization period and the next may preferably range from one minute to one hour, depending on the type of the organic component having a low boiling point, the composition of the aqueous solution, the pore size of the porous membrane, and other factors.

The resulting concentrated vapor mixture composed of the organic component having a low boiling point and water is then liquefied by introducing it into a suitable liquefaction means. Although a cold trap is usually used as the liquefaction means, it is also possible to use a barometric condenser.

After the resulting concentrated aqueous solution of the organic component having a low boiling point is returned to room temperature or heated, a further concentrated vapor of the organic component having a low boiling point is obtained by bringing the concentrated aqueous solution into contact with a hydrophobic nonporous membrane and evacuating the side of the membrane opposite to the concentrated aqueous solution in the second stage of the method of the present invention. Since the permeation rate of vapors is inversely proportional to the thickness of the membrane, the nonporous membrane used for this purpose should desirably as thin as possible, provided that its strength and separation properties are acceptable. In practice, nonporous membranes having a thickness of 80 $\mu$m or less are suitable for use in the method of the present invention. The material of the membrane can be ny of various hydrophobic materials, and typical examples thereof include silicone rubber, polycarbonates, polyolefins, polyfluoroolefins and the like. Similarly to the previously described porous membrane, the nonporous membrane may be in the form of a flat membrane, but it is preferable to use hollow fibers. As used herein, the term "nonporous membrane" does not necessarily denote membranes consisting entirely of a nonporous material (i.e., homogeneous membranes), but can also comprehend composite membranes consisting of a nonporous membrane provided with a supporting or reinforcing porous membrane on one side or both sides.

In the method of the present invention, it is essential to evacuate the side of the nonporous membrane opposite to the concentrated aqueous solution (i.e., the "opposite side" of the membrane). Also at this second stage, the resulting further concentrated vapor mixture of the organic component having a low boiling point and water may be recovered simply by evacuating the "opposite side" of the membrane. However, it is also possible to evacuate the "opposite side" of the membrane while causing an inert gas to flow therethrough as a carrier gas for the vapor mixture to be recovered. Again, the flow of the inert gas permits the vapor mixture having passed through the membrane to be forcibly removed from the membrane surface, exhibiting the effect of improving the separation efficiency. The inert gas used for this purpose may be the same as that which was caused to flow through the "opposite side" of the porous membrane. Preferred examples of such gases include air, nitrogen gas and carbon dioxide gas.

The reduced pressure level to which the "opposite side" is evacuated should conveniently be as low as possible, because this enhances the separation rate of the organic component having a low boiling point. However, it usually suffices to evacuate the "opposite side" to a pressure in the range of 0.1 to 380 mmHg.

In the same manner as described previously in connection with the first stage, the resulting further concentrated vapor mixture containing the low-boiling organic component at a higher concentration is then liquefied by introducing it into a suitable liquefaction means. Again, a cold trap or a barometric condenser is used as the liquefaction means.

Where the method of the present invention is applied to a continuous fermentation process by using the broth obtained therefrom as the aqueous solution containing an organic component having a low boiling point, a portion of the broth may be continuously withdrawn from the fermenter by means of a feed pump, passed through a separator-concentrator having a hydrophobic porous membrane incorporated therein to separate the fermentation product therefrom, and then returned to the fermenter. In the continuous fermentation process combined with the separation and concentration method of the present invention, neither the inorganic salts nor the raw material for fermentation passes through the membrane of the separator-concentrator, so that the raw material for fermentation only needs to be supplied to the broth in such an amount as to make up for the portion consumed by fermentation. However, in cases where the waste materials produced by the microorganisms during long-term fermentation cause a reduction in fermentation capability, it is preferable to periodically withdraw a portion (i.e., several percent by volume) of the broth and supply a fresh culture medium. In the above-described process, the need for a separate stirring device is eliminated because the broth is stirred by withdrawing it from the fermenter and returning it thereto. Instead of feeding the broth to the separator-concentrator by means of a pump, the separator-concentrator may be placed in the fermenter so as to bring the broth into contact with one surface of the membrane. However, this necessitates a suitable means for stirring the broth.

Figure 2:
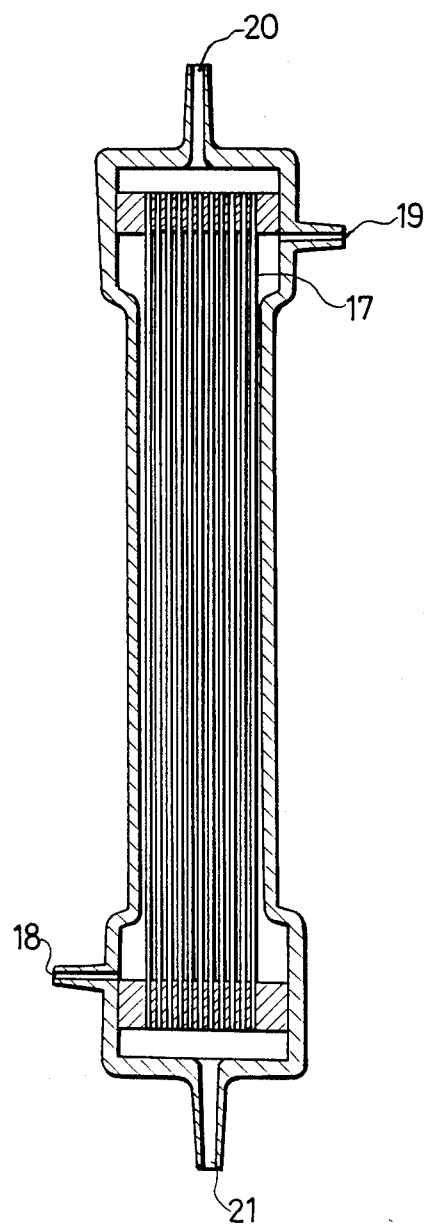
FIGS. 2 and 3 are schematic sectional views of separator-concentrators having porous hollow fibers or nonporous hollow fibers incorporated therein.
Figure 3:
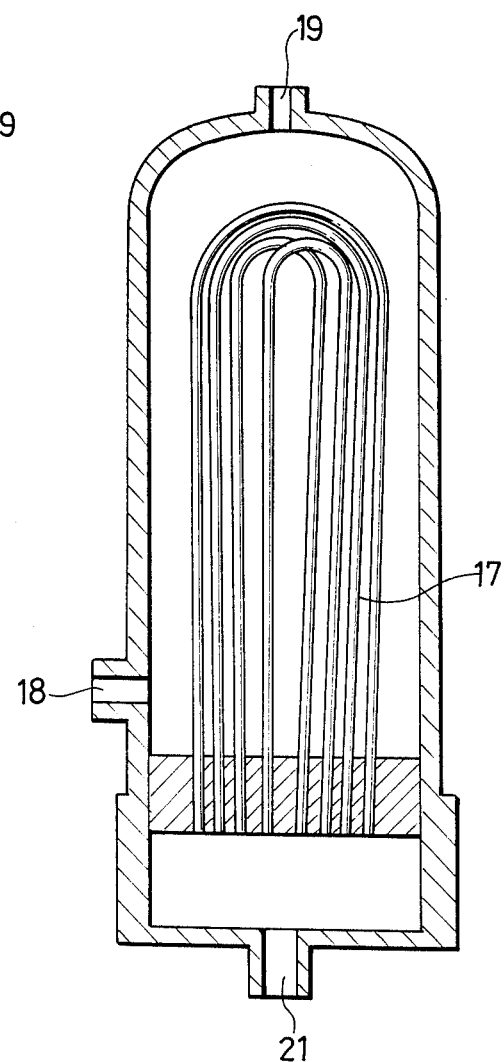

The method of the present invention will be more fully described with reference to the accompanying drawings wherein FIG. 1 is a flow chart illustrating one embodiment of the method of the present invention and FIGS. 2 and 3 are schematic sectional views of hollow fiber modules having hydrophobic porous hollow fibers or hydrophobic nonporous hollow fibers incorporated therein and being suitable for use as separator-concentrators.

In this embodiment, an aqueous solution containing an organic component having a low boiling point is placed in an aqueous solution tank 1. By means of a circulating pump 2, the aqueous solution is transferred into a first stage separator-concentrator 3 through its aqueous solution inlet 18. Then, the aqueous solution flows through the first-stage separator-concentrator 3 while keeping contact with the outer surfaces of porous hollow fibers 17. Thereafter, it is discharged from an aqueous solution outlet 19 and returned to the aqueous solution tank 1.

The hollow fibers 17 have a porous structure pierced by minute openings, but are of a hydrophobic nature. Thus, the aqueous solution containing the organic component having a low boiling point cannot pass through the wall (or porous membrane) of the hollow fibers as long as it is in liquid form. When the bores of the hollow fibers are evacuated, the organic component having a low boiling point and water vaporize within the confines of the wall and the resulting vapors flow into the evacuated bores of the hollow fibers. In this process, the vapor-liquid equilibrium relationship between water and the organic component having a low boiling point causes the vapor mixture present in the bores of the hollow fibers to have a higher organic component concentration than the aqueous solution. Where a device as illustrated in FIG. 3 is used as the separator-concentrator and the bores of the hollow fibers are simply evacuated, the resulting vapor mixture emerges from its vapor outlet 21. Where a device as illustrated in FIG. 2 is used as the separator-concentrator and a carrier gas such as nitrogen gas is passed through the bores of the hollow fibers by supplying it from a gas cylinder 12 by way of a flowmeter 13 and a carrier gas inlet 20 and sucking it from a vapor outlet 21 by means of a vacuum pump 11, the resulting vapor mixture, together with the carrier gas, emerges from the vapor outlet 21. This vapor mixture emerging from the vapor outlet 21 is liquefied in a cold trap 4 which has been cooled, for example, to −40° C. The resulting concentrated aqueous solution is then transferred to an intermediate tank 5.

Next, by means of a circulating pump 6, the concentrated aqueous solution is transferred into a second-stage separator-concentrator 7 through its aqueous solution inlet 18. Then, the concentrated aqueous solution flows through the second-stage separator-concentrator 7 while remaining in contact with the outer surfaces of hydrophobic nonporous hollow fibers 17. Thereafter, it is discharged from an aqueous solution outlet 19 and returned to the intermediate tank 5. When the bores of the nonporous hollow fibers are evacuated, water and the organic component having a low boiling point permeate through the nonporous membrane and enter the bores of the hollow fibers. However, since water and the organic component having a low boiling point permeate through the hydrophobic nonporous membrane at different rates, the vapor mixture obtained in the bores of the hollow fibers contains the low-boiling organic component at a still higher concentration. Also in the second-stage separator-concentrator 7, a carrier gas is supplied from the gas cylinder 12 by way of a flowmeter 14 and passed through the bores of the hydrophobic nonporous hollow fibers. The vapor mixture obtained in the bores of the nonporous hollow fibers, together with the carrier gas, is sucked out by means of the vacuum pump 11 and introduced into a second cold trap 8 kept at low temperature. Thus, the vapor mixture is liquefied to give a further concentrated aqueous solution of the organic component having a low boiling point. The system illustrated in FIG. 1 further includes manometers 9 and 10 for measuring the reduced pressure level, an electromagnetic valve 15 for effecting changeover between pressurization and evacuation of the side of the hydrophobic porous membrane opposite to the aqueous solution fed to the first-stage separator-concentrator 3, and a timer 16 for presetting the intervals and durations of pressurization and evacuation.

In the first-stage separator-concentrator 3, it may happen that, in addition to vapors, liquid components leak in the bores of the hollow fibers for some reason or other. In such a case, the liquid recovered in the cold trap 4 will show a reduction in the concentration of the organic component having a low boiling point. Accordingly, it is preferable to provide a liquid trap (a room-temperature or warm trap) between the vapor outlet of the first-stage separator-concentrator 3 and the cold trap 4. In the embodiment illustrated in FIG. 1, the bores of the hollow fibers incorporated in the first-stage and second-stage separator-concentrators are evacuated with a single vacuum pump 11. However, separate vacuum pumps may be connected to the first-stage and second-stage separator-concentrators. Moreover, only one first-stage separator-concentrator is included in the embodiment illustrated in FIG. 1. However, there may preferably be used any required number of first-stage separator-concentrators arranged in parallel, depending on the capacity of the second-stage separator-concentrator.

Where it is desired to carry out a continuous fermentation process, this can be accomplished by providing a conventional fermenter in place of the reservoir 1. In this case, the temperature of the fermenter may be different from that of the first-stage separator-concentrator, provided that the temperature difference exerts no influence on the activity of the yeast cells.

The separation and concentration method of the present invention makes it possible to readily obtain a highly concentrated aqueous solution of an organic component having a low boiling point from an aqueous solution containing the organic component at a relatively low concentration. Moreover, even if an aqueous solution containing considerable amounts of impurities (such as a broth) is used as the starting solution, the resulting liquid concentrate is free from yeast cells, inorganic salts and raw materials (such as glucose and the like). Furthermore, the combined use of a hydrophobic porous membrane and a hydrophobic nonporous membrane enhances the permeation rate of vapors and permits more efficient operation, as compared with the prior art pervaporation method. In particular, the use of hollow fibers is advantageous in that the equipment can be made more compact. In the first-stage separator-concentrator, moreover, the side of the membrane opposite to the aqueous solution may be alternately evacuated and pressurized at predetermined intervals of time to clean the surface of the membrane and restore the hydrophobicity of the membrane. This technique permits stable operation over a long period of time and can be applied to continuous fermentation processes.

What is more, the method of the present invention is also advantageous in that organic components having a low boiling point and free from any other nonvolatile matter can be efficiently recovered from waste liquids containing the organic components having a low boiling point, such as waste liquids from various processes.

The present invention is further illustrated by the following examples.

EXAMPLE 1

This example illustrates a batch process in which the first-stage operation and the second-stage operation were carried out separately.

Figure 4:
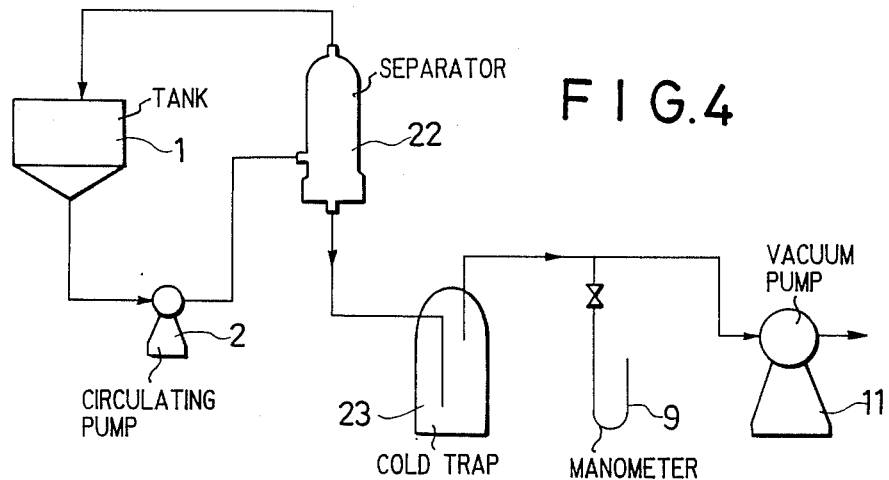
FIG. 4 is a flow chart illustrating the separation and concentration system used in the examples given later.

Using porous polypropylene hollow fibers having a bubble point of 12.5 kg/cm$^2$, an air permeability of $7 \times 10^4$ liters/m$^2$·hr.0.5 atm., a porosity of 45%, a membrane thickness of 22 μm, an inner diameter of 200 μm and an effective length of 160 mm, a first-stage separator-concentrator of the structure illustrated in FIG. 2 was constructed so as to give an effective surface area of 0.5 m$^2$. Then, a separation and concentration system as illustrated in FIG. 4 was assembled by using the aforesaid first-stage separator-concentrator. Ten liters of an aqueous solution composed of 10 wt.% of ethanol and 90 wt.% of water was placed in the aqueous solution tank 1 and circulated through the separator-concentrator 22. The cold trap 23 was kept at a temperature of −40° C. and the separator-concentrator was evacuated to a pressure of about 20 mmHg. When the system was operated for 2 hours under these conditions, 170 g of a liquid having an ethanol concentration of 49 wt.% was recovered from the cold trap 23. A separately prepared liquid having the same composition was added to the recovered liquid to make a total volume of 10 liters.

Next, using nonporous silicon rubber hollow fibers having an air permeability of 15 liters/m$^2$·hr. 1 atm., a membrane thickness of 80 μm, an inner diameter of 170 μm, an outer diameter of 330 μm and an effective length of 160 mm, a second-stage separator-concentrator of the structure illustrated in FIG. 2 was constructed so as to give an effective surface area of 0.5 m$^2$. Then, the first-stage separator-concentrator included in the separation and concentration system was replaced by the aforesaid second-stage separator-concentrator. Then, the aforesaid liquid having an ethanol concentration of 49 wt.% was placed in the aqueous solution tank and circulated through the separator-concentrator. The separator-concentrator was evacuated to a pressure of about 10 mmHg and the cold trap was kept at a temperature of −40° C. When the system was operated for 2 hours under these conditions, 80 g of liquid was recovered from the cold trap. This liquid had an ethanol concentration of 81 wt.%.

EXAMPLE 2

Using the same separator-concentrators and associated equipment as used in Example 1, the procedure of Example 1 was repeated except that a 20 wt.% aqueous solution of ethanol was used in place of the 10 wt.% aqueous solution of ethanol. Specifically, the first-stage concentration was carried out by circulating a 20 wt.% aqueous solution of ethanol through the system. After 2 hours' operation, there was obtained a liquid having an ethanol concentration of 67 wt.%. To this liquid was added a separately prepared liquid having the same composition. Using this liquid, the second-stage operation was carried out in the same manner as described in Example 1. Thus, there was obtained a liquid concentrate having an ethanol concentration of 93 wt.%.

What is claimed is:

1. A method for separating and concentrating an organic component having a lower boiling point then water from an aqueous solution containing said organic component, which comprises the steps of:
   (i) contacting said aqueous solution containing said organic component having a lower boiling point than water with a major surface of a hydrophobic porous membrane;
   (ii) exposing another major surface of said hydrophobic porous membrane opposite to said aqueous solution to a vacuum to obtain a first vapor having a higher concentration of said organic component than said aqueous solution;
   (iii) liquifying said first vapor to obtain a first concentrated solution having a higher concentration of said organic component when said aqueous solution;
   (iv) contacting said first concentrated solution with a major surface of a hydrophobic nonporous membrane; and
   (v) exposing another major surface of said hydrophobic nonporous membrane opposite to said first concentrated solution to a vacuum to obtain a second vapor having a higher concentration of said organic component than said first vapor.

2. A method as claimed in claim 1 wherein said hydrophobic porous membrane has a bubble point of not less than 1 kg/cm$^2$.

3. A method as claimed in claim 1 wherein said step of exposing another major surface of said hydrophobic porous membrane opposite to said aqueous solution to a vacuum is carried out continuously.

4. A method as claimed in claim 1 wherein said step of exposing said another major surface of said hydrophobic porous membrane opposite to said aqueous solution comprises exposing said another major surface to a vacuum and pressure alternately at predetermined intervals of time.

5. A method as claimed in claim 1 wherein said another major surface of said hydrophobic porous membrane opposite to said aqueous solution is exposed to a vacuum of 380 mmHg or below.

6. A method as claimed in claim 4 wherein said another major surface of said hydrophobic porous membrane opposite to said aqueous solution is exposed to a gauge pressure of from 150 mmHg to 760 mmHg.

7. A method as claimed in claim 1 wherein said step of exposing said another major surface of said hydrophobic nonporous membrane opposite to said first concentrated solution to a vacuum is carried out while causing an inert gas to flow along said another major surface of said hydrophobic nonporous membrane.

8. A method as claimed in claim 1 wherein said another major surface of said hydrophobic nonporous membrane opposite to said first concentrated solution is exposed to a vacuum of 380 mmHg or below.

9. A method as claimed in claim 1 wherein said aqueous solution containing said organic component having a lower boiling point than water is a fermentation broth.

10. A method as claimed in claim 3, wherein said step of exposing said another major surface of said hydrophobic porous membrane opposite to said aqueous solution to a vacuum is carried out while passing an inert gas along said another major surface.

11. A method as claimed in claim 4, wherein said step of exposing said another major surface of said hydrophobic porous membrane opposite to said aqueous solution to a vacuum is carried out while passing an inert gas along said another major surface.

12. A method as claimed in claim 1 wherein said hydrophobic porous membrane has a thickness of from 10 to 100 μm.

13. A method as claimed in claim 12, wherein said hydrophobic porous membrane has a thickness of from 20 to 60 μm.

14. A method as claimed in claim 1, wherein said hydrophobic porous membrane has a porosity of from 20 to 80%.

15. A method as claimed in claim 14, wherein said hydrophobic porous membrane has a porosity of from 40 to 75%.

16. A method as claimed in claim 1, wherein said hydrophobic porous membrane is in the form of a hollow fiber.

17. A method as claimed in claim 1, wherein said organic component is one member selected from the group consisting of methanol, ethanol, butanol, acetone, tetrahydrofuran, and triethylamine.

18. A method as claimed in claim 17, wherein said organic component is ethanol.

19. A method as claimed in claim 1, which further comprises the step of:
(vi) liquifying said second vapor to obtain a second concentrated solution having a higher concentration of said organic component than said first concentrated solution.

* * * * *